United States Patent [19]

Zebker et al.

[11] Patent Number: 4,829,303

[45] Date of Patent: May 9, 1989

[54] DATA VOLUME REDUCTION FOR IMAGING RADAR POLARIMETRY

[75] Inventors: Howard A. Zebker, Pasadena; Daniel N. Held, Altadena; Jakob J. van Zyl, Pasadena; Pascale C. Dubois, South Pasadena; Lynne Norikane, Arcadia, all of Calif.

[73] Assignee: The United States of America as represented by the Administrator of the National Aeronautics and Space Administration, Washington, D.C.

[21] Appl. No.: 195,225

[22] Filed: May 18, 1988

[51] Int. Cl.$^4$ .............................................. G01S 13/90
[52] U.S. Cl. ..................................... 342/25; 342/190; 342/195
[58] Field of Search .................. 342/25, 99, 145, 188, 342/189, 190, 192, 195

[56] References Cited

U.S. PATENT DOCUMENTS

| | | | |
|---|---|---|---|
| 4,101,891 | 7/1978 | Jain et al. | 342/25 X |
| 4,292,634 | 9/1981 | Wu et al. | 342/25 X |
| 4,321,601 | 3/1982 | Richman | 342/25 X |
| 4,323,898 | 4/1982 | Barnes et al. | 342/25 X |
| 4,323,899 | 4/1982 | Barnes et al. | 342/25 |
| 4,546,355 | 10/1985 | Boles | 342/25 X |
| 4,594,593 | 6/1986 | Nohmi | 364/728 X |
| 4,616,227 | 10/1986 | Homma et al. | 342/25 |
| 4,660,044 | 4/1987 | Lavelle | 342/188 |
| 4,724,418 | 2/1988 | Weindling | 342/25 |
| 4,758,838 | 7/1988 | Maeda et al. | 342/25 |

Primary Examiner—Thomas H. Tarcza
Assistant Examiner—John B. Sotomayor
Attorney, Agent, or Firm—Thomas H. Jones; Paul F. McCaul; John R. Manning

[57] ABSTRACT

Two alternative methods are disclosed for digital reduction of synthetic aperture multipolarized radar data using scattering matrices, or using Stokes matrices, of four consecutive along-track pixels to produce "averaged" data for generating a synthetic polarization image.

5 Claims, 4 Drawing Sheets

DATA VOLUME REDUCTION FOR IMAGING RADAR POLARIMETRY

ORIGIN OF THE INVENTION

The invention described herein was made in the performance of work under a NASA contract, and is subject to the provision of Public Law 96-517 (35 U.S.C. 202) in which the contractor has elected not to retain title.

TECHNICAL FIELD

This invention relates to a method for digital reduction of synthetic aperture multipolarized radar data while still allowing full polarimetric utility of the data. The technique results in about 12.8-fold reduction in volume to allow multipolarized radar data to be used by a university and small industry users.

BACKGROUND ART

Recent radar measurements show that different ground locations respond differently when the polarization of either the receiving or the transmitting antenna is varied (see Dino Guili, "Polarization diversity in radars," Proceedings of the IEEE, Vol. 74, No. 2, February 1986). In 1985, a polarimeter was flown on a NASA aircraft, recording data which were subsequently processed and stored at the Jet Propulsion Laboratory. One difficulty inherent in this experiment was the large storage necessary for each of the images; only a limited number of data sets could be stored. Furthermore, the computer time necessary to synthesize a picture using an arbitrary transmit and receive polarization is mostly devoted to cumbersome data transfers. Clearly, the volume of data needs to be reduced in order to provide the user with a more flexible investigation tool, yet the data volume reduction must not impact the noise level by introducing additional error. Some theoretical concepts will first be presented for clarity and review, as well as a description of the operations necessary to generate a synthetic polarization image from the original data sets. Then two new methods of data compression will be described.

STATEMENT OF THE INVENTION

In a first embodiment of the invention, the scattering matrices of four consecutive along-track pixels are "averaged," while in a second embodiment, the Stokes matrices of four consecutive along-track pixels are "averaged." In both cases, the average matrices are stored as a reduced data set. Each approach in terms of data volume reduction and in terms of errors introduced in the synthesized images substantially reduces the size of mercury required for each of the images, and the number of operations is also reduced, thus reducing data processing time. This is accomplished in one approach by compressing scattering matrices, and in the other by compressing Stokes matrices. The reduced data set is smaller in the first approach than that created by compressing Stokes matrices. However, greater error is introduced by compressing scattering matrices: these errors may be as great as 10% to be compared to typically less than $10^{-3}$ when the compression algorithm operates on the Stokes matrices.

DETAILED DESCRIPTION OF THE INVENTION

The expression for the electric field of an electromagnetic wave propagating along the z axis is:

$$E(z,t) = Re \begin{vmatrix} E_H(z,t) \\ E_V(z,t) \end{vmatrix} = Re(h\, e^{i(kz-wt)}) \quad (1)$$

where, $$h = \begin{vmatrix} a_H \\ a_V e^{-i\delta} \end{vmatrix} \exp(i\delta_H), \text{ and } \delta = \delta_H - \delta_V$$

where h is the polarization vector, $E_H$ and $E_V$ are the horizontally and vertically polarized components of the electric field with respective magnitudes $a_H$ and $a_V$ and aruguments $\delta_H$ and $\delta_V$.

Another way to describe the same electric field is given by the Stokes parameters, defined as follows:

$$G_0 = a_H^2 + a_V^2$$
$$G_1 = a_H^2 - a_V^2$$
$$G_2 = 2 a_H a_V \cos(\delta) \quad (2)$$
$$G_3 = 2 a_H a_V \sin(\delta)$$

The Stokes vector is the vector whose components are the four Stokes parameters. If $G_0^2 = G_1^2 + G_2^2 + G_3^2$, the electromagnetic wave is said to be fully polarized.

If the backscattering phenomena is assumed to be linear, isotrospic and homogeneous, the backscattered wave polarization vector $h_s$ may be expressed as $$h_s = S h_t \text{ where } S = \begin{vmatrix} S_{xx} & S_{xy} \\ S_{yx} & S_{yy} \end{vmatrix} \quad (3)$$

where $h_t$ is the polarization vector of the incident wave or transmitting antenna and S, the scattering matrix, is a 2×2 complex matrix. If $h_r$ is the polarization vector of the receiving antenna, the complex amplitude of the received signal is:

$$V = h_r^T S h_t \quad (4)$$

Thus, once the scattering matrix is known, a synthesized response may be computed for any desired configuration of antenna polarization states defined by $h_r$ and $h_t$.

Similarly, the 4×4 real Stokes matrix F relates the power of the signal received to the Stokes vectors defining the polarization state of the receiving and transmitting antennas, $G_r$ and $G_t$.

$$P = G_r^T F G_t \qquad (5)$$

If the reciprocatory principle applies, then the scattering matrix is symmetrical and so is the Stokes matrix. In that case, the Stokes matrix can be derived from the scattering matrix as follows (the general relation can be found in "Light scattering by small particles," H. C. Van de Hulst, Dover publication):

$$J_{xxxx} = S_{xx}S_{xx}^* \quad J_{xxxy} = S_{xx}S_{xy}^*$$
$$J_{yyyy} = S_{yy}S_{yy}^* \quad J_{xyyy} = S_{xy}S_{yy}^*$$
$$J_{xyxy} = S_{xy}S_{xy}^* \quad J_{xxyy} = S_{xx}S_{yy}^*$$

where the asterisk indicates the conjugate of the signal indicated.

$$F_{11} = 0.25 (J_{xxxx} + 2J_{xyxy} + J_{yyyy}) \quad F_{23} = 0.5 \, Re \, (J_{xxxy} - J_{xyyy}) \qquad (6)$$
$$F_{12} = 0.25 (J_{xxxx} - J_{yyyy}) \qquad F_{24} = 0.5 \, Im \, (-J_{xxxy} + J_{xyyy})$$
$$F_{13} = 0.5 \, Re \, (J_{xxxy} + J_{xyyy}) \qquad F_{33} = 0.5 \, Re \, (J_{xxyy} + J_{xyxy})$$
$$F_{14} = 0.5 \, Im \, (-J_{xxxy} - J_{xyyy}) \qquad F_{34} = 0.5 \, Im \, (-J_{xxyy})$$
$$F_{44} = 0.5 \, Re \, (-J_{xxyy} + J_{xyxy})$$

There is enough information in either the Stokes matrix, F, or the scattering matrix, S, to synthesize any polarization configuration. The scattering matrix yields a synthesized signal whose power is identical to the power obtained from the Stokes matrix as long as the waves are fully polarized.

A wave is fully polarized if it can be expressed as the superposition of a horizontally polarized part (HP) and a vertically polarized part (VP). The polarization vector describes the electric field as a combination of a vertical part and a horizontal part. Therefore this representation is always referring to a fully polarized wave. Since the scattering matrix is the linear operator associated with a polarization vector, the scattering matrix representation of a scatterer assumes that this scatterer cannot introduce any diffuse component (part of a wave which is not polarized) in the backscattered wave. The backscattered wave has to be fully polarized because it is written as a polarization vector. The Stokes vector representation, as opposed to the polarization vector representation, allows for a diffuse component which can be estimated by the difference $G_0^2 - (G_1^2 + G_2^2 + G_3^2)$ (see H. C. Van de Hulst, supra). Consequently, the Stokes matrix representation of a scattering surface can include this depolarization phenomena.

Three methods will now be described with a complete set of data from an imaging radar polarimeter flown in 1985 on a NASA CV990 aircraft. Out of the subsequent data set, three images were chosen which feature a variety of targets for experimental testing of an original (prior art) process illustrated in FIG. 1 and two new processes, one using a scattering matrix approach illustrated in FIG. 2 and the other using a Stokes matrix approach illustrated in FIG. 3. The original process requires about 128 megabytes of synthetic aperture image data storage for one scene (frame). The complete data set is comprised of 4.2 million one-look pixels, 1024×4 points in the along-track direction and 1024 pixels in the range direction. For each pixel, four complex elements are stored per scattering matrix. A, B, C, and D in blocks 10, 11, 12, and 13 represent four consecutive along-track pixels. Since a complex number is 8 bytes long, the storage requirements are 128 megabytes. If the reciprocity principle is assumed, then the scattering matrix should be symmetrical and only the three different elements of the scattering matrix need be stored. In fact, this property is assumed when calibrating the data.

Figure 1:
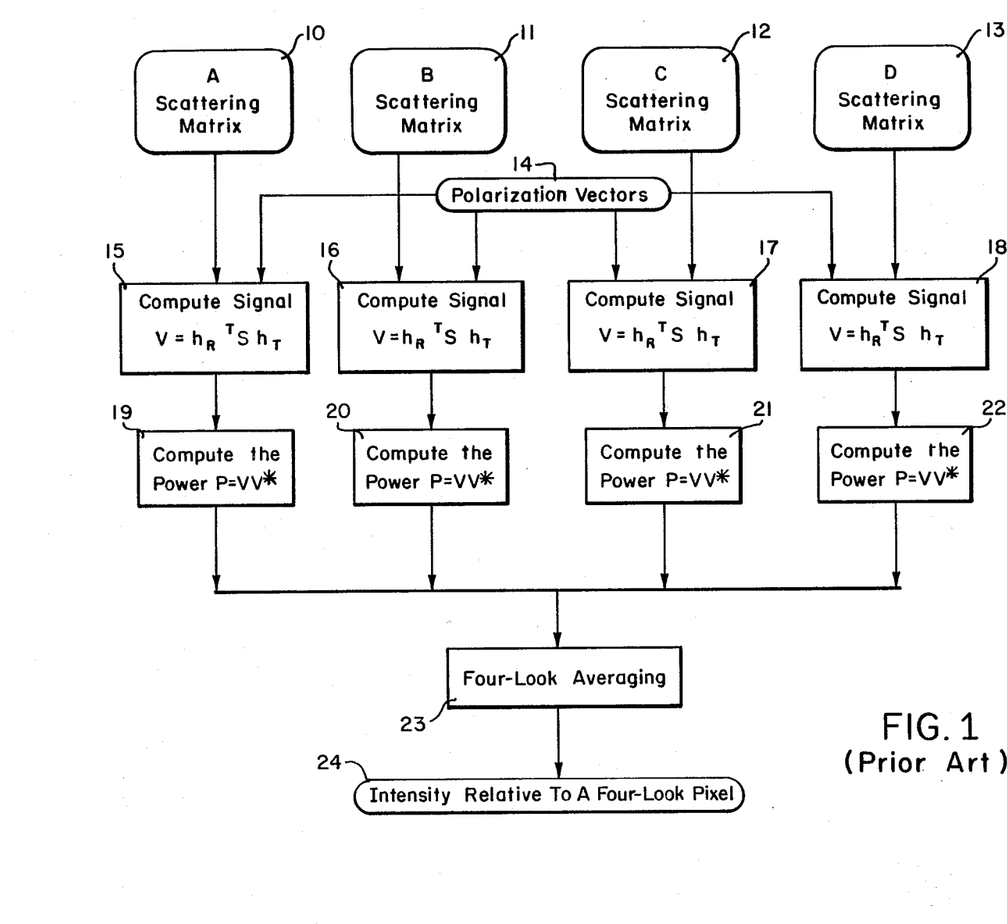
FIG. 1 illustrates a flow chart of a prior art process for generating a synthetic polarization image from a set of imaging radar polarimeter data.

In the original process, it was necessary to generate one synthetic polarization image from this set of data in the following manner. The polarization vectors of both the transmitting and the receiving antenna (not shown) of the experiment are chosen. The received signal is synthesized for each pixel using equation (4), as indicated by blocks 15, 16, 17 and 18. The resulting powers are then computed in blocks 19, 20, 21 and 22. The last step consists of averaging the computed power of 4 consecutive along-track points in block 23. This operation reduces statistical variations and makes the element of resolution approximately square. Each resulting averaged pixel now has an associated power and the image is ready for display, as indicated in block 24, namely as intensity relative to one four-look pixel.

This process of synthesizing an image of arbitrary polarization requires about twenty minutes on a VAX 785 computer. Future users of the data will want to interact quickly with the picture making a faster process highly desirable. Reducing the size of the data set decreases the processing time. The consequently reduced storage requirements also allow the storge of more data sets where only a few were previously possible.

Figure 2:
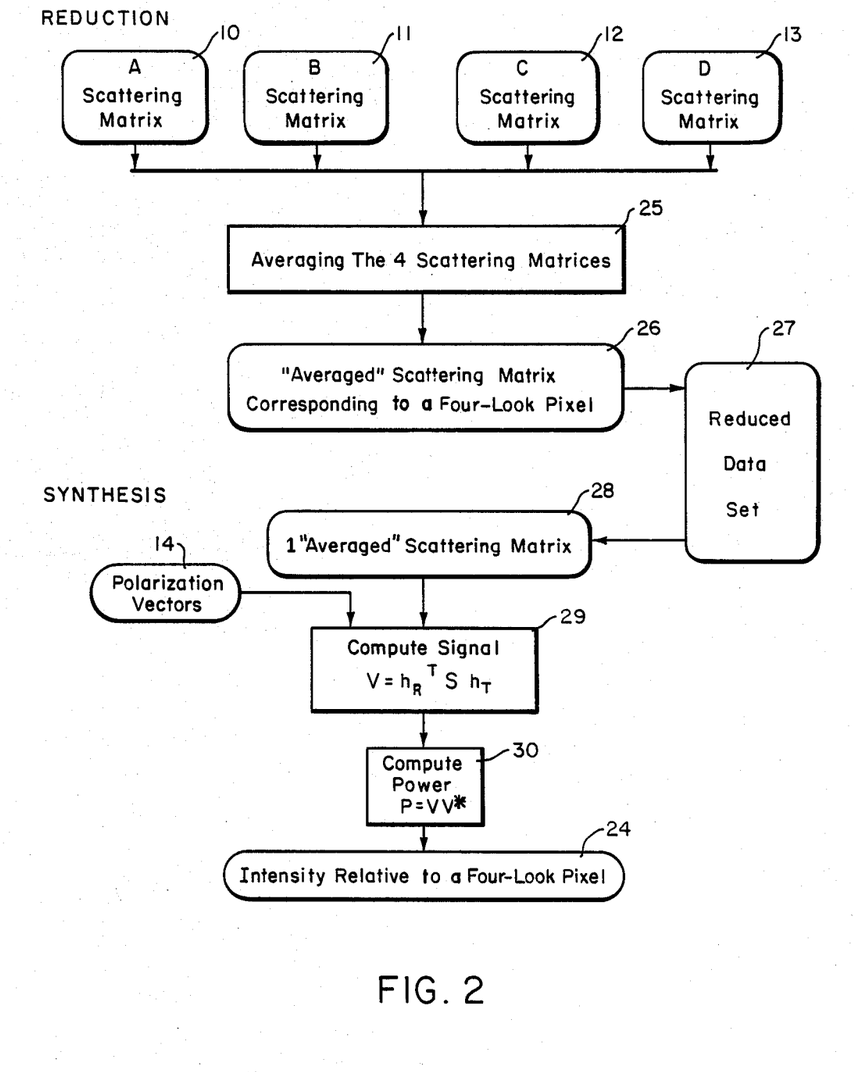
FIG. 2 illustrates a flow chart of a first new method (scattering matrix approach) for generating a synthetic polarization image with data volume reduction.
Figure 3:
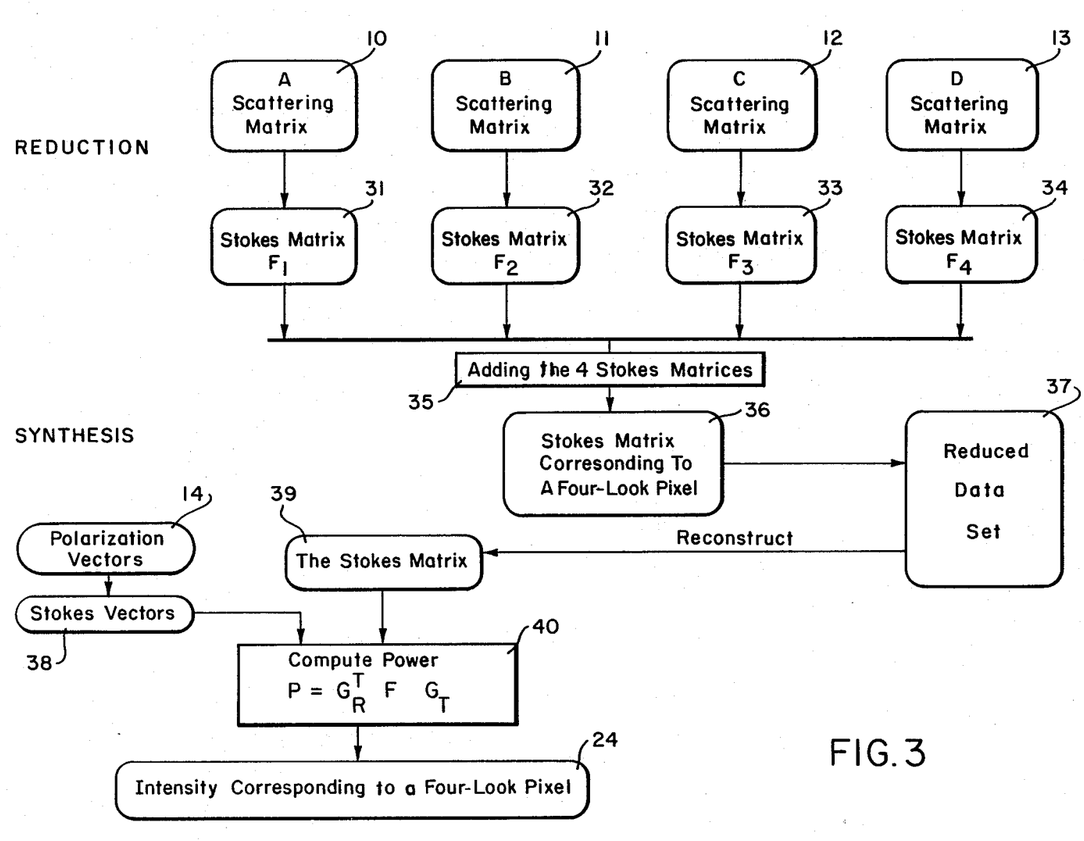
FIG. 3 illustrates a flow chart of a second new method (Stokes matrix approach) for generating a synthetic polarization image with data reduction.

Two different data reduction methods have been developed for reduced storage requirements using different approaches referred to hereinbefore as the scattering matrix approach and the Stokes matrix approach. In each case, a matrix corresponding to four along-track consecutive pixels A, B, C and D is stored as the result of an "averaging" operation done directly on the matrices, and not, as in the original process just described above, done on the synthesized signal power. The two new methods are detailed in the following sections, and a comparative study of the results is presented in a subsequent section. In each approach, the four complex elements A, B, C and D of the scattering matrix are stored as indicated at the top of FIGS. 2 and 3 in blocks 10, 11, 12 and 13.

THE SCATTERING MATRIX APPROACH

An "average" of the scattering matrices is computed rather than an average of the synthesized signal powers: the "average" scattering matrix corresponding to one four look pixel is then the only information needed to synthesize a picture. FIG. 2 is a flow chart which describes the process. For convenience in understanding this first embodiment and the second to be described afterwards, the same reference numerals ae employed for the same elements or blocks as used in FIG. 1. First an average scattering matrix is computed in block 25 for every set of four consecutive points in the azimuth direction. This matrix is stored in 8 bytes of computer memory represented by block 26. Eight megabytes of memory are then required to store the entire reduced data set for one image.

Each time it is desired to generate a picture from a reduced data set 27, the first step is to choose the transmit and received polarization vectors in block 14. The synthesized signal is then computed using equation (4) and its power from $P=VV^*$, but in this case the reduced data set is of averaged scattering matrices of four-look pixels, as indicated by blocks 28, 29 and 30, thus reducing the number of operations required to synthesize a complete image. The process is faster than before because less data is being manipulated and fewer operations are being performed. Data reduction can only be effectively achieved by carefully choosing the "averaging" method. The scattering method will now be described in more detail.

Let A, B, C and D be the four scattering matrices to be "averaged," corresponding to four consecutive points in the azimuth direction and let S be the resulting matrix.

$$A = \begin{vmatrix} A_{xx} A_{xy} \\ A_{yx} A_{yy} \end{vmatrix} \quad B = \begin{vmatrix} B_{xx} B_{xy} \\ B_{yx} B_{yy} \end{vmatrix}$$

$$C = \begin{vmatrix} C_{xx} C_{xy} \\ C_{yx} C_{yy} \end{vmatrix} \quad D = \begin{vmatrix} C_{xx} C_{xy} \\ C_{yx} C_{yy} \end{vmatrix}$$

In the output image, each pixel is associated simply with an intensity, and the absolute phase information of the four received signals can be discarded, although the relative phases re yet required. Therefore, the absolute phase of the scattering matrix can be set arbitrarily. The power in each element of the "averaged" matrix is computed as follows:

$$|S_{xx}| = \text{sqrt}(A_{xx}A_{xx}^* + B_{xx}B_{xx}^* + C_{xx}C_{xx}^* + D_{xx}D_{xx}^*)$$

$$|S_{xy}| = \text{sqrt}(A_{xy}A_{xy}^* + B_{xy}B_{xy}^* + C_{xy}C_{xy}^* + D_{xy}D_{xy}^*)$$

$$|S_{yx}| = \text{sqrt}(A_{yx}A_{yx}^* + B_{yx}B_{yx}^* + C_{yx}C_{yx}^* + D_{yx}D_{yx}^*)$$

$$|S_{yy}| = \text{sqrt}(A_{yy}A_{yy}^* + B_{yy}B_{yy}^* + C_{yy}C_{yy}^* + D_{yy}D_{yy}^*)$$

(7)

where "sqrt" signifies "the square root of . . . " In the following, the phase of $S_{xx}$ is set to zero. As discussed before, this is legitimate as long as the phases of the other terms relative to $S_{xx}$ are preserved.

This method for calculating the phase puts more weight on the vectors of large amplitude which are presumably less sensitive to noise. The information to be coded consists of four amplitudes and three phases and can be stored in 8 bytes as follows:

2 bytes for the maximum amplitude stored as a mantissa and an exponent.
3 bytes for the three remaining amplitudes.
3 bytes for the three phases.

After reduction, the data consists of $1024 \times 1024$ pixels and 8 bytes per pixel, resulting in an overall reduction ratio of 16. The reduced data set may then be processed to synthesize a complete image, using one "averaged" scattering matrix per pixel, as indicated in block 28 and then proceeding in blocks 29 and 30 by computing only one signal using equation (4) and then computing power by the equation $P=VV^*$ to produce the same signal in block 24 as in the original method. Thus, in reducing data by averaging the four scattering matrices in block 25, there is only one signal processing path in synthesizing a complete image, instead of the four in the original method illustrated in FIG. 1.

THE STOKES MATRIX APPROACH

FIG. 3 is a flow chart which describes the second new method for data volume reduction. Using equation (5), each scattering matrix A, B, C and D in blocks 10, 11, 12 and 13 is transformed into its corresponding Stokes matrix $F_1$, $F_2$, $F_3$ and $F_4$ in blocks 31, 32, 33 and 34. One interesting property associated with the Stokes matrix is that it yields directly the power given the Stokes vectors of both the receiving and the transmitting antennas (equation 7). Therefore the two following processes are equivalent; adding the synthesized power of the signal scattered from 4 different areas or adding the 4 Stokes matrices characteristic of the four areas, and then computing the power of the resulting signal from this composite matrix. Let $F_1$, $F_2$, $F_3$, $F_4$ be the Stokes matrices associated with four consecutive pixels and, let $G_t$ and $G_r$ be the Stokes vectors of the transmitting and receiving antennas, respectively. The powers $P_i$ corresponding to the phase matrix $F_i$ are given by:

$$P_i = G_R^T F_i G_t \tag{8}$$

The four-look averaging process consists of adding the powers of four consecutive pixels as indicated in block 35. The resulting P can be expressed as follows:

$$P = \Sigma P_i \Sigma G_r^T F_i G_t = G_r^T (\Sigma F_i) G_t \tag{9}$$

Therefore, it is possible to add the four Stokes matrices corresponding to four consecutive points in the azimuth direction to form a single Stokes matrix, as indicated in FIG. 3 by block 36. This process is equivalent to a four-look averaging operation. The resulting Stokes matrix corresponding to a four-look pixel is then stored in block 37 in a compressed form as the reduced data set.

To form an image from this reduced data set stored in block 37, the transmit and received Stokes vectors are computed (blocks 38) from the corresponding polarization vectors 14 in equation (2). For each pixel, the Stokes matrix (block 39) is selected from the reduced data set 37 and the synthesized signal power is obtained in block 40 through equation (7).

Each Stokes matrix in block 36 is a $4 \times 4$ symmetrical real matrix. It consists of 10 distinct elements, nine of which are independent (equation 5). The tenth, $F_{22}$, can be computed fromm three of the nine elements as follows:

$$F_{22} = F_{11} - F_{33} - F_{44} \tag{10}$$

$F_{11}$ is the largest element and is always positive. It is coded in two bytes as a mantissa and an exponent. The eight other independent elements are scaled by $F_{11}$ and coded in 1 byte each. Therefore, the complete phase matrix can be stored using 10 bytes. The complete data set for one image ($1024 \times 1024$ pixels) is now stored in $10 \times 1024 \times 1024$ bytes. The overall reduction factor from the original data is 12.8.

COMPARATIVE STUDY OF THE RESULTS OF THE DIFFERENT ALGORITHMS

A testing procedure necessary to validate the different algorithms and to compare their performances compares a polarization signature obtained from the original data set with the corresponding polarization signature computed from the reduced data set. A polarization signature is a surface in which height corresponds to the intensity of the signal received by an antenna transmitting a polarization defined by the x and y coordinates of the point on the surface. The output of this program is:

$$\text{Error} = \sqrt{\frac{\iint (I - \hat{I})^2 \sin_\chi d_\chi d_\psi}{\iint I^2 \sin_\chi d_\chi d_\psi}} \qquad (11)$$

where I is the intensity of the pixel computed from the original data and $\hat{I}$ is the intensity computed from the reduced data set. The integration is computed over the set of all possible polarizations for the emitting antenna assuming the receiving antenna is the same as the emitting antenna (copolarized error) or assuming that the receiving and emitting antennas are orthogonal or crosspolarized (cross-polarized error).

The test program outputs shown below indicate the difference between the original polarization surface and the one computed from the reduced data set for both reduction methods.

| ERROR (Eq. 11) | | Forest area | Urban area | Ocean area |
|---|---|---|---|---|
| copol signa | Scattering matrix method | 7.19 E-2 | 4.10 E-2 | 8.80 E-2 |
| | Stokes matrix method | 4.06 E-4 | 3.40 E-4 | 3.14 E-4 |

| ERROR (Eq. 11) | | Forest area | Urban area | Ocean area |
|---|---|---|---|---|
| cross-pol signa | Scattering matrix method | 1.20 E-1 | 7.20 E-2 | 1.20 E-1 |
| | Stokes matrix method | 4.18 E-4 | 3.09 E-4 | 4.25 E-4 |

The Stokes matrix method yields smaller error than the scattering matrix method. The four-look averaging process on the original data set corrsponds to adding the power of four consecutive pixels and therefore is completely equivalent to adding the four corresponding Stokes matrices. The scattering matrices yield the complex field, not the power of the received signal and "averaging" four consecutive scattering matrices is not equivalent to a four-look average. The Stokes matrix representation allows for a diffuse component while the scattering matrix representation ignores it. For this reason, the Stokes matrix compression introduces smaller error in the data. The compression ratio is better in the case of the scattering method but the resulting errors are not acceptable. The Stokes matric algorithm was chosen and can be further improved as follows.

OPTIMIZATION OF THE STOKES MATRIX METHOD

The error computed above can be somewhat reduced by more carefully choosing the storage procedures. The method preferred is based on a probabilistic knowledge of the relative magnitudes of terms in the Stokes matrix.

As discussed previously, $F_{11}$, the largest element of the Stokes matrix, is coded in two bytes. The first one corresponds to the exponent EXP and the second one corresponds to the mantissa MAN.

$$\text{EXP} = E(ln(F_{11})/ln2), \qquad (12)$$

$$\text{MAN} = F_{11}/2^{EXP}$$

where E(x) is the largest integer smaller than x.

Since MAN is always less than 2 and greater or equal to 1, better precision can be achieved by storing MAN as:

$$\text{byte}(2) = E(254*(MAN - 1.5)) \qquad (13)$$

where byte(2) will range between $-128$ and 127. EXP is stored directly as one byte:

$$\text{byte}(1) = \text{EXP} \qquad (14)$$

The eight remaining elements are first scaled by $F_{11}$ $$P_{ij} = F_{ij}/F_{11} \qquad (15)$$

The absolute value of each $P_{mn}$, where the subscripts mn designate a particular $P_{ij}$, is always less than 1. Two different strategies are possible for the storage of each term: storing $P_{mn}$ directly or storing its square root. If $P_{mn}$ is digitized in 1 byte, the resulting error is $\pm 2^{-8}$. If $\sqrt{P_{mn}}$ is digitized, the error on $\sqrt{P_{mn}}$ is $\pm 2^{-8}$, therefore the resulting $P_{mn}$ is:

$$(\sqrt{P_{mn}} \pm 2^{-8})^2 \approx P_{mn} \pm \sqrt{P_{mn}} \, 2^{-7}$$

Figure 4:
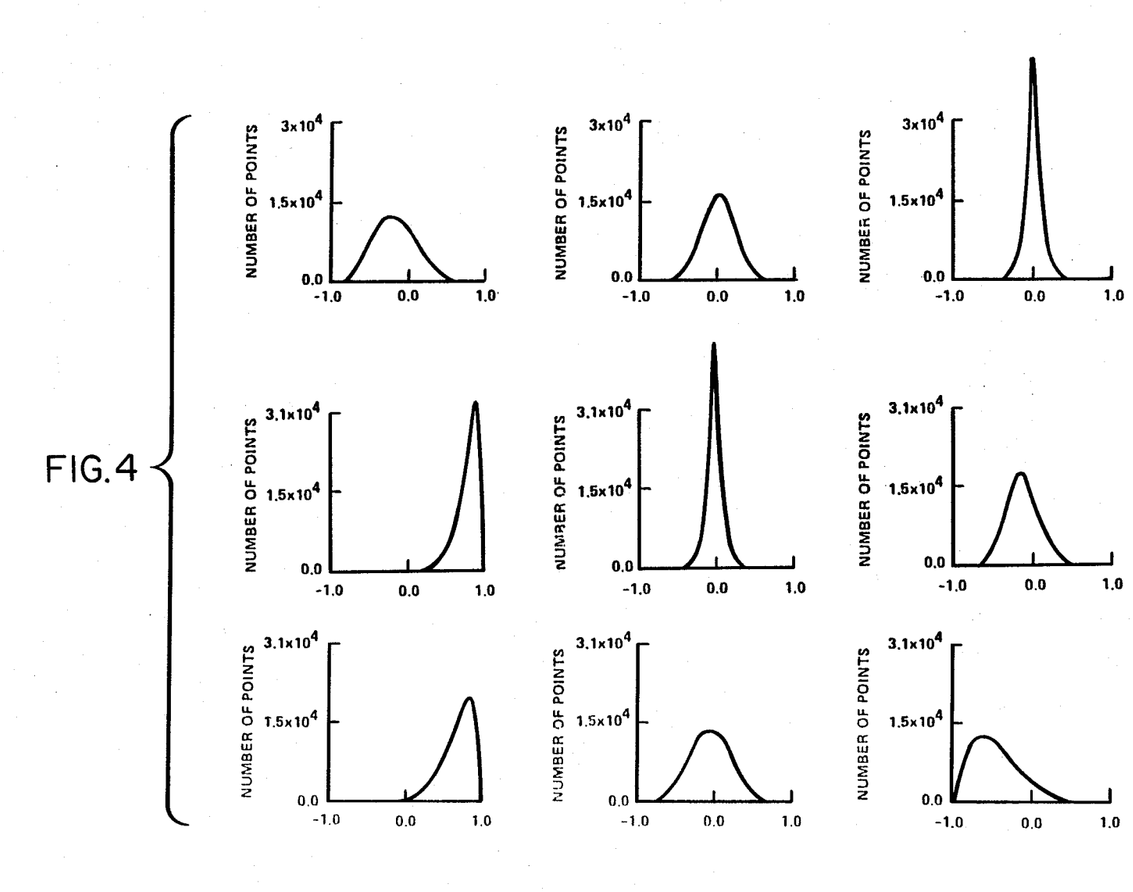
FIG. 4 is a typical histogram of the Stokes matrix elements $F_{mn}$ used as an example in determining the preferred method for optimizing the Stokes matrix method of data reduction illustrated in FIG. 3.

Comparing $2^{-8}$ and $2^{-7}\sqrt{P_{mn}}$ shows that taking the square root yields better results as long as $\sqrt{P_{mn}}$ is less than 0.5, i.e., $P_{mn} < 0.25$. A typical histogram of each $P_{mn}$ from actual data collected over the San Francisco Bay area is presented in FIG. 4. $P_{11}$, $P_{33}$, $P_{44}$ are mostly larger than 0.25 while $P_{12}$, $P_{13}$, $P_{14}$, $P_{23}$, $P_{24}$, $P_{34}$ tend to be smaller.

In the case where the square root of P is stored, $$\text{byte}(i) = E(\text{sign}(P_{mn})* \sqrt{|P_{mn}|} *127) \qquad (16)$$

Where E(x) is the largest integer smaller than x and sign(x) = $-1$ when x is negative and $+1$ otherwise. When P is stored directly, $$\text{byte}(i) = E(127*P_{mn}) \qquad (17)$$

Four different algorithms, each corresponding to the different numbers of square root elements were tested and the table below shows the differences between them.

| | Algo. A | Algo. B | Algo. C | Algo. D |
|---|---|---|---|---|
| $P_{12}$ | normal | normal | normal | normal |
| $P_{13}$ | normal | normal | Square rt | Square rt |
| $P_{14}$ | normal | Square rt | Square rt | Square rt |
| $P_{23}$ | normal | Square rt | Square rt | Square rt |
| $P_{24}$ | normal | normal | Square rt | Square rt |
| $P_{33}$ | normal | normal | normal | normal |
| $P_{34}$ | normal | normal | normal | Square rt |
| $P_{44}$ | normal | normal | normal | normal |

For example, the square root of $P_{24}$ is stored for algorithm C and D according to equation (16). In algorithm A and B, $P_{24}$ is stored directly (equation (17)).

The tests conducted on these algorithms consist of comparing the signature surfaces of a specific area, generated from the studied algorithm to the signature surfaces generated from the unreduced set of data. The test results, which are error percentages, are presented below.

| error (Eq. 11) | | Algo. A | Algo. B | Algo. C | Algo. D |
|---|---|---|---|---|---|
| forest | co | 4.06 E-4 | 4.46 E-4 | 2.80 E-4 | 2.58 E-4 |
| area | cross | 4.18 E-4 | 3.71 E-4 | 4.11 E-4 | 3.48 E-4 |
| urban | co | 3.40 E-4 | 3.95 E-4 | 3.23 E-4 | 3.25 E-4 |
| area | cross | 3.09 E-4 | 2.10 E-4 | 2.13 E-4 | 2.24 E-4 |
| ocean | co | 3.14 E-4 | 3.07 E-4 | 2.08 E-4 | 2.09 E-4 |
| area | cross | 4.25 E-4 | 4.29 E-4 | 2.51 E-4 | 2.51 E-4 |

The square root operation requires more processing when reducing the data as well as when generating a picture. A trade off has to be made between better precision and a faster method. Algorithm C was finally chosen. The errors introduced by algorithm C are smaller than when algorithm B is used. Algorithm D is more complex and its results are comparable with those of algorithm C.

The data reduction algorithm scheme finally adopted involves four square roots (Algorithm C):

$$\text{byte (3)} = E(127 * P_{12}) \qquad (18)$$

$$\text{byte (4)} = E(127 * \text{sign}(P_{13}) * \sqrt{|P_{13}|})$$

$$\text{byte (5)} = E(127 * \text{sign}(P_{14}) * \sqrt{|P_{14}|})$$

$$\text{byte (6)} = E(127 * \text{sign}(P_{23}) * \sqrt{|P_{23}|})$$

$$\text{byte (7)} = E(127 * \text{sign}(P_{24}) * \sqrt{|P_{24}|})$$

$$\text{byte (8)} = E(127 * P_{33})$$

$$\text{byte (9)} = E(127 * P_{34})$$

$$\text{byte (10)} = E(127 * P_{35})$$

RECONSTRUCTION OF THE STOKES MATRIX

To reconstruct the Stokes matrix from the reduced data, the following operations are required:

$$F(1,1) = (\text{byte}(2)/254 + 1.5) 2^{\text{byte}(1)}$$

$$F(1,2) = \text{byte}(3) * F(1,1)/127$$

$$F(1,3) = \text{sign}(\text{byte}(4)) * [\text{byte}(4)/127]^2 * F(1,1)$$

$$F(1,4) = \text{sign}(\text{byte}(5)) * [\text{byte}(5)/127]^2 * F(1,1)$$

$$F(2,3) = \text{sign}(\text{byte}(6)) * [\text{byte}(6)/127]^2 * F(1,1)$$

$$F(2,4) = \text{sign}(\text{byte}(7)) * [\text{byte}(7)/127]^2 * F(1,1)$$

$$F(3,3) = \text{byte}(8) * F(1,1)/127$$

$$F(3,4) = \text{byte}(9) * F(1,1)/127 \qquad (19)$$

$$F(4,4) = \text{byte}(10) * F(1,1)/127$$

$$F(2,2) = F(1,1) - F(3,3) - F(4,4)$$

CONCLUSION

A method of reducing required storage space for multipolarimetric synthetic aperture radar data has been developed which preserves signal integrity. The data reduction operation reduces the required storage space by 12.8 and speeds the image synthesis process by a factor of 10 in time. The errors introduced in the output images are of the order of $10^{-4}$. Thus operations with polarimetric data are greatly facilitated and are within reach of even small research groups.

Although particular embodiments of the invention have been described and illustrated herein, it is reocgnized that modifications and variations may readily occur to those skilled in the art. Consequently, it is intended that the claims be interpreted to cover such modifications and variations.

We claim:

1. A method for reduction of digital synthetic aperture multipolarized radar data while still allowing full polarimetric utility of said data, comprised of averaging and storing matrices corresponding to four along-track consecutive pixels, and using a set of average matrices thus stored to synthesize an image by computing a power signal for each average matrix corresponding to a four-look pixel after first choosing the transmit and received polarization vectors, thereby reducing the data set and number of operations required to synthesize an image for displays.

2. A method as defined in claim 1 wherein the process of reducing said data set for one image by averaging matrices corresponding to four along-track consecutive pixels comprises computing the average scattering matrix corresponding to each of said along-track consecutive pixels of an image, and wherein synthesis of an image from said reduced data set comprises first choosing transmit and receive polarization vectors, and then computing for each image pixel a synthesized signal from the equation $$V = h_r^T S h_t$$

where $h_r$ and $h_t$ are the desired receive and transmit polarization vectors, S is a two-by-two complex scattering matrix and for each synthesized signal of a four-look pixel, computing its power $P = VV^*$ for each thereby producing a signal for each pixel having an intensity relative to a four-look pixel V.

3. A method as defined in claim 2 wherein the four scattering matrices to be averaged are given by $$A = \begin{vmatrix} A_{xx} A_{xy} \\ A_{yx} A_{yy} \end{vmatrix} \quad B = \begin{vmatrix} B_{xx} B_{xy} \\ B_{yx} B_{yy} \end{vmatrix}$$

$$C = \begin{vmatrix} C_{xx} C_{xy} \\ C_{yx} C_{yy} \end{vmatrix} \quad D = \begin{vmatrix} D_{xx} D_{xy} \\ D_{yx} D_{yy} \end{vmatrix}$$

wherein the power in each element of the averaged matrix is computed as follows:

$$|S_{xx}| = \text{sqrt}(A_{xx} A_{xx}^* + B_{xx} B_{xx}^* + C_{xx} C_{xx}^* + D_{xx} D_{xx})$$

$$|S_{xy}| = \text{sqrt}(A_{xy} A_{xy}^* + B_{xy} B_{xy}^* + C_{xy} C_{xy}^* + D_{xy} D_{xy})$$

$$|S_{yx}| = \text{sqrt}(A_{yx}A_{yx}{}^* + B_{yx}B_{yx}{}^* + C_{yx}C_{yx}{}^* + D_{yx}D_{yx}{}^*)$$

$$|S_{yy}| = \text{sqrt}(A_{yy}A_{yy}{}^* + B_{yy}B_{yy}{}^* + C_{yy}C_{yy}{}^* + D_{yy}D_{yy}{}^*)$$

and the phase of $S_{xx}$ is set to zero while the phases at other terms $S_{xy}$, $S_{yx}$, and $S_{yy}$ are preserved as follows:

$$\text{Arg}(S_{xx}) = 0$$

$$\text{Arg}(S_{xy}) = \text{Arg}(A_{xy}A_{xx}{}^* + B_{xy}B_{xx}{}^* + C_{xy}C_{xx}{}^* + D_{xy}D_{xx}{}^*)$$

$$\text{Arg}(S_{yx}) = \text{Arg}(A_{yx}A_{xx}{}^* + B_{yx}B_{xx}{}^* + C_{yx}C_{xx}{}^* + D_{yx}D_{xx}{}^*)$$

$$\text{Arg}(S_{yy}) = \text{Arg}(A_{yy}A_{xx}{}^* + B_{yy}B_{xx}{}^* + C_{yy}C_{xx}{}^* + D_{yy}D_{xx}{}^*).$$

4. A method as defined in claim 3 wherein each pixel has coded information said coded information includes four amplitudes, one for each of $S_{xx}$, $X_{yx}$ and $S_{yy}$, and three phases, one for each of $S_{xy}$, $S_{yx}$ and $S_{yy}$ in 8 bytes as follows:

2 bytes for amplitude stored as mantissa and exponent for the first amplitude $S_{xx}$, 3 bytes for the three remaining amplitudes $S_{xy}$, $S_{yx}$ and $S_{yy}$, 3 bytes for the three phases, and the phase of $S_{xx}$ is set to zero so it need not be stored.

5. A method as defined in claim 1 wherein the process of reducing said data set for one image by averaging matrices corresponding to four along-track consecutive pixels, comprises transforming each scattering matrix of four-look pixels into a Stokes matrix, and adding the four resulting Stokes matrices to produce a Stokes matrix corresponding to each four-look pixel, and wherein synthesis of an image from said reduced data set comprises first choosing transmit and receive polarization vectors, transforming said chosen vectors into Stokes vectors of the transmitting and receiving vectors, and then computing for each time pixel a synthesized power signal from the equation $$P_i = G_r{}^T F_i G_t$$

to produce an intensity signal corresponding to one four-look pixel, where $G_t$ and $G_r$ are the Stokes transmit and receive vectors, $P_i$ corresponds to the Stokes matrix $F_i$, and the Stokes matrix $F_i$ is a four-by-four symmetrical real matrix.

* * * * *